June 15, 1937.  W. H. NICHOLS  2,083,858
HAND-FED MACHINE TOOL
Filed June 5, 1935   2 Sheets-Sheet 1

Inventor
William H. Nichols

June 15, 1937. W. H. NICHOLS 2,083,858
HAND-FED MACHINE TOOL
Filed June 5, 1935 2 Sheets-Sheet 2

Inventor
William H. Nichols

Patented June 15, 1937

2,083,858

UNITED STATES PATENT OFFICE 2,083,858

HAND-FED MACHINE TOOL

William H. Nichols, Waltham, Mass.

Application June 5, 1935, Serial No. 25,045

10 Claims. (Cl. 90—15)

The present invention relates to machine tools of the type in which the tool is advanced or fed to the work by the muscular force of an operator. In the embodiment chosen for illustration the operating tool is a milling cutter carried by a reciprocatable head sliding in a vertical guideway, and the means for advancing and retracting the tool slide includes a lever arranged to be grasped and moved in the appropriate direction by the operator's hand. While the action thus effected is literally a manual one, I wish to make it understood that the invention which I claim is not necessarily limited to the performance of this operation by the hand rather than the foot or some other part of the operator's person; in other words the term "manual" as used in this specification is to be construed as including the muscular actuation by the operator, however applied.

The objects of the invention are to improve and simplify the means for driving the tool spindle of such a machine and means for counterbalancing the weight of the vertically movable tool-carrying slide. These objects are accomplished by providing an electric motor as the prime mover, with accessories later described, and by causing the motor itself to serve as the counterbalance for the tool slide. Secondary objects and characteristics appear in the following specification. The invention comprises all novel characteristics, combinations and principles of the specific machine described in this specification with reference to the drawings, and all substantially equivalent variations thereof, within the scope of the appended claims as construed with reference to the prior art.

In the drawings,—

Like reference characters designate the same parts wherever they occur in all the figures.

Figure 1:
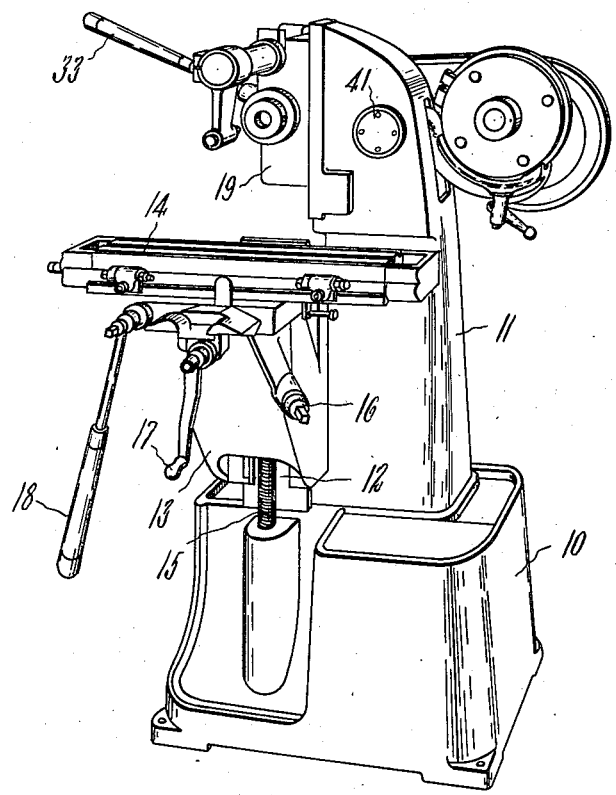
Fig. 1 is a perspective view as seen from the front of a so called hand milling machine embodying the invention.
Figure 2:
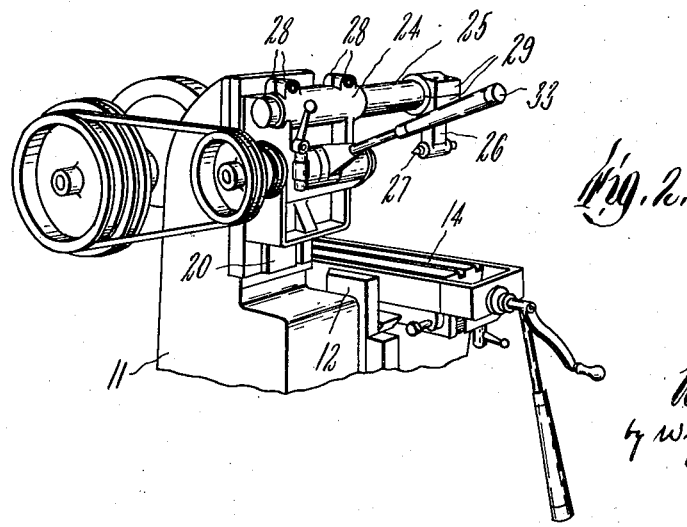
Fig. 2 is a perspective view as seen from the rear of the upper portion of such machine.

The supporting structure of the machine comprises a base or pedestal 10 and a column 11 rising from the base. On the lower part of the column at the front thereof is a vertical guide 12 on which a bracket or knee 13 is mounted for vertical movement. A work table 14 is supported on the bracket with provision for movement horizontally both in and out, and from right to left, with reference to the column. These parts, and the screw 15, shaft 16, crank 17, and lever 18, for operating them are not novel with the present invention, except in combination with the parts later described, and need no detailed description herein.

Figure 3:
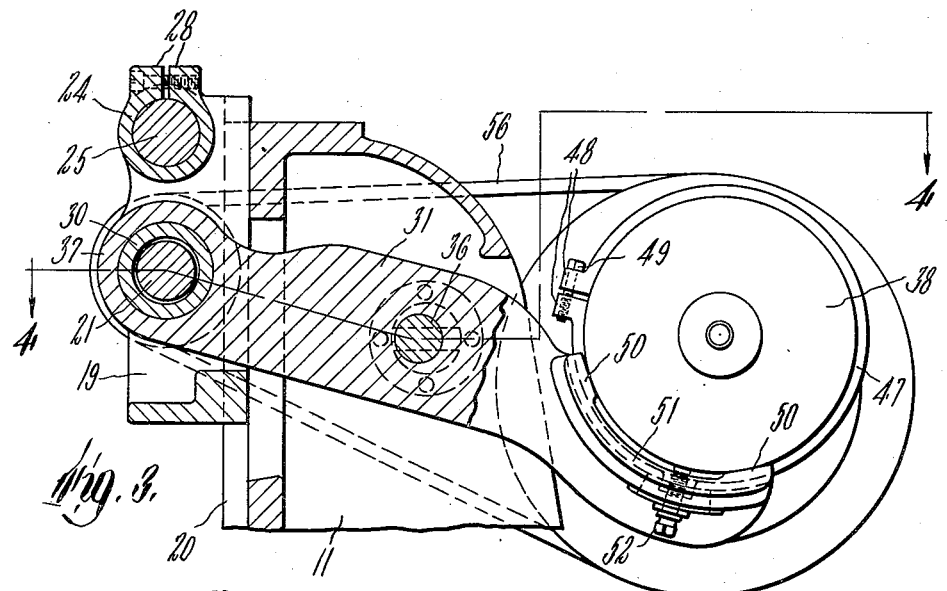
Fig. 3 is a fragmentary sectional view, on a larger scale, of the upper part of the machine represented as taken on a plane parallel to the lateral dimension of the machine and intersecting the column, the tool slide, tool spindle, and counterbalance lever; the driving motor being shown in elevation.
Figure 4:
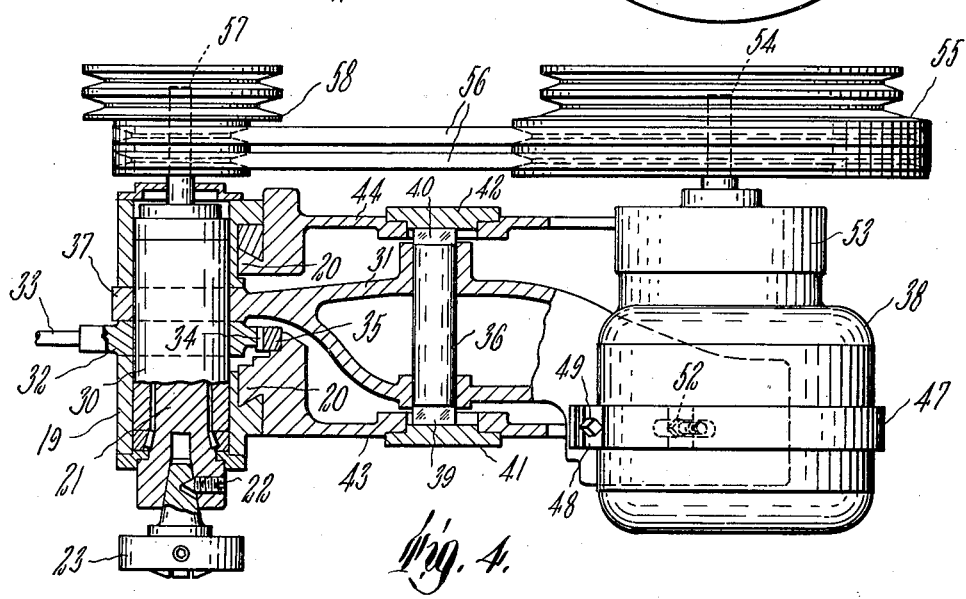
Fig. 4 is a horizontal section and partial plan view taken on line 4—4 of Fig. 3.

At one side of the column near its upper end is a tool-carrying slide 19 engaged with a vertical guideway 20, details of which are shown in Figs. 3 and 4. In this slide is rotatably mounted a tool spindle 21 having an opening in one end and a set screw 22 projecting into such opening, for receiving and securing the shank of a chuck 23. The shank of a cutting tool, or one end of an arbor adapted to carry a cutter, may be secured either in such chuck or directly in the spindle itself. There is also mounted on the slide, in a split bearing 24, a bar 25 carrying an arm 26 in which is mounted a dead center 27 adapted to be alined with the spindle axis for supporting the outer end of a tool or tool arbor connected with the spindle. Bar 25 is adjustable endwise and angularly in the bearing 24 and may be secured by tightening up the bearing by means of bolts contained in lugs 28 which project from the bearing at opposite sides of its division plane. Arm 26 is provided with a split hub removably fitting the bar 25 and having lugs 29 adapted to be drawn together by bolts to clamp it on the bar.

The part of slide 19 which contains the tool spindle is fitted with a lining sleeve 30, which surrounds the spindle and provides a pivot for connecting with a counterbalance lever 31 and for supporting an operating member 32. Such operating member is a ring rotatably fitted to the sleeve 30, carrying an operating arm and handle 33 and provided with a gear segment portion 34 (Fig. 4) at the side next to the column. Such gear segment meshes with a rack 35 secured to the column between the parts of the guide 20. Thus the slide may be moved up and down by raising and lowering handle 33.

The counterbalance lever 31 is supported between its ends by a pivot 36. One of its arms is coupled with the tool slide by an eye 37 fitted to the pivot sleeve 30, and its other arm supports and carries a driving motor 38. The lengths of these lever arms and the location of the fulcrum axis are so related to one another and to the weights of the slide and motor as to permit mounting of the fulcrum pivot 36 in the column 11 and to obtain an approximate balance between the motor and the slide, or at least so nearly a balance as to insure that the latter will remain in any position desired by the operator.

Figures 5, 6:
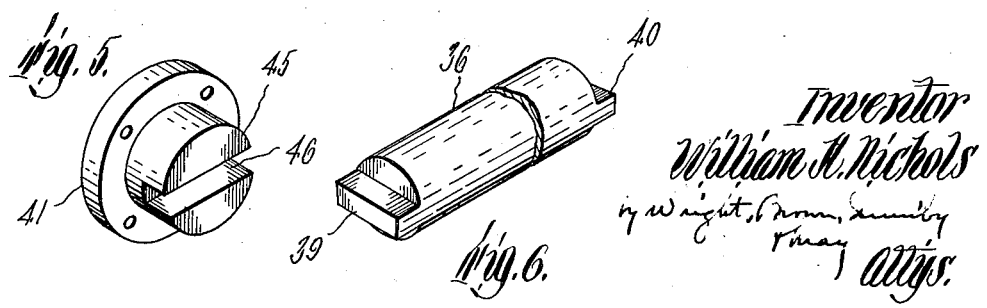
Figs. 5 and 6 are detail perspective views of the pivot bearings and pivot by which the counterbalance lever is supported.

The tool carrier is constrained by its guide 20 to travel in a straight line. To permit angular movement of the counterbalance lever about its fulcrum and compensate for change of angularity without altering the length of the lever arm which supports the slide, the fulcrum pivot 36 is mounted with capability of displacement horizontally. Its ends are formed with ribs or wings 39 and 40, the upper and lower sides of which are plane and parallel to one another and equally distant from the axis of the pivot. Bearing blocks or plates 41 and 42 are mounted on the separated front and rear webs 43 and 44 of the column, partly across and partly within centrally alined holes in these webs. The parts 45 of such bearing blocks (Fig. 5) which protrude into the holes are formed with transverse slots 46, the opposite faces of which are plane and parallel and are spaced to fit the ribs 39 and 40 respectively of the pivot bar. The holes which receive the bearing blocks are properly located and of such width, and so also are the intruding parts of the bearing blocks, as to give scope for the necessary movement of the pivot. Rims or flanges on the bearing blocks overlap the edges of the holes and are bolted to the column so as to hold the guideways of both blocks parallel and at the same height.

The casing of motor 38 is cylindrical and is encircled by a cylindrical band or strap 47, the ends of which are provided with lugs 48 and are drawn together by a bolt 49. The motor casing is seated against separated raised pads 50 on the concave upper side of the outer arm of the counterbalance lever. This part of the lever is provided with a forwardly extending flange 51, thus providing a broad seat for the motor casing. A bolt 52 passes through flange 51 into strap 47 to secure the motor in place; and the strap projects into grooves in the pads 50, whereby it prevents endwise displacement of the motor. Reducing gearing of any suitable character, not shown, is contained within a gear casing extension 53 of the motor casing and couples the motor armature with a protruding shaft 54 on which a drive pulley, or collection of pulleys, 55 is detachably mounted. The pulley collection shown is composed of two steps, each having two grooves of equal diameters for the reception of V belts 56. An extension 57 of the tool spindle carries detachably a complemental two-step pulley 58. The pulleys 55 and 58 are interchangeable with one another on the shaft extensions 54 and 57; thus providing scope for four different driving speeds of the tool spindle. The pulley shaft 54 is eccentric to the center of the motor casing and strap 47, whereby rotation of the motor affords a means for adjusting and regulating the tension of the driving belt. Such adjustment is permitted by loosening screw 52 and rotating the motor unit, the screw then moving in a slot in flange 51. If adjustment beyond the range permitted by this slot is required, the strap 47 may be loosened and the motor turned within it.

The employment of the driving motor as a counterpoise for the tool carrier accomplishes this necessary counterbalancing effect without adding to the weight of the machine as a whole, by using a property of the motor, its weight, which has never been usefully applied heretofore in a machine tool of this type, to the best of my knowledge. The mounting of the lever pivot to be displaceable horizontally causes the lever arms to remain the same as to their respective lengths in all positions and, in particular, prevents change in the center distance between the pulleys in consequence of rectilinear movement of the tool carrier. This avoids necessity of intertermediate belt guiding or tensioning means. Thus the desired effects are obtained with the greatest possible simplicity and minimum of parts and weight.

The principles of the means herein described for these purposes are evidently applicable in various forms and manifestations for use in other machines than milling machines; and are not necessarily restricted to those in which the tool spindle is horizontal. They are applicable likewise to reversals of the illustrated machine such, for instance, as those in which the spindle carried by the movable carrier is adapted to hold a work piece instead of a tool; and to situations where the counterpoise may overbalance or underbalance the carrier in greater or less degree. Equivalents of the belt and pulley drive, such as sprocket wheels and a chain, for instance, and other types of gearing between the motor and spindle, are included within the protection claimed hereby.

What I claim and desire to secure by Letters Patent is:—

1. In a machine tool, a spindle carrier, guides engaging said carrier and constraining it to move in a straight line, a lever having arms at opposite sides of its fulcrum connected by one of its arms to said carrier, a driving motor mounted on the other arm of said lever as a counterweight to said carrier, and a driving connection between said motor and spindle.

2. In a machine tool, a spindle carrier, vertical guides engaging said carrier and constraining it to move in a straight line, a spindle rotatably mounted in said carrier, a lever pivoted on a horizontal fulcrum axis and having arms extending to opposite sides of its fulcrum, one of which arms is coupled to said carrier, an electric motor supported by the other arm of said lever and rotation-transmitting means between the motor and spindle.

3. A machine tool comprising a supporting structure having upright guiding means, a carrier engaging said guiding means and constrained thereby to move in an invariable path, a lever pivoted on said supporting structure to swing about a fulcrum axis at one side of and transverse to the guiding means, and having an arm extending laterally to one side of such axis into direct pivoted engagement with the carrier on an axis parallel to the fulcrum axis, and a second arm in rigid union with the first-named arm extending to the opposite side of said fulcrum axis, a driving motor supported on said second arm whereby its weight opposes the weight of the carrier, a driving pulley supported and driven by said motor, a spindle rotatably mounted in said carrier, a driven pulley connected to impart rotation to the spindle, and transmission belting surrounding said driving and driven pulleys; the lever being shiftable bodily so as to maintain uniform tension in said belting in all positions of the carrier.

4. A machine tool comprising a supporting structure having rectilinear guiding means, a spindle engaged with said guiding means and constrained thereby to travel in a straight line, a lever having a pivotal engagement with the carrier, a pivot for the lever mounted in the supporting structure at one side of said guide arranged with its axis horizontal and movable bodily in directions transverse to both its axis and to the path of the carrier, said lever being engaged with said pivot and having an arm extending to the side thereof opposite to the carrier, and a counterweight supported by said last named arm.

5. A machine tool comprising a supporting structure having a rectilinear guide, a spindle carrier engaged with said guide and constrained thereby to travel in a given path, a lever having a pivot connection with said carrier, a fulcrum pivot for the lever movably mounted on the supporting structure with capability for moving bodily toward and away from the path of the carrier, and being arranged to locate the fulcrum axis of the lever in a line transverse to both the path of the carrier and the displacement path of the fulcrum pivot, said lever having an arm extending to the opposite side of the fulcrum pivot from the carrier, a motor supported by said lever arm, a spindle rotatably mounted in said carrier, pulleys carried by the motor and spindle respectively and transmission belting surrounding said pulleys.

6. A machine tool comprising a supporting structure having a rectilinear guide, a spindle carrier engaged with said guide and constrained thereby to travel in a given path, a lever having a pivot connection with said carrier, a fulcrum pivot for the lever movably mounted on the supporting structure with capability for moving bodily toward and away from the path of the carrier, and being arranged to locate the fulcrum axis of the lever in a line transverse to both the path of the carrier and the displacement path of the pivot, said lever having an arm extending to the opposite side of the pivot from the carrier, a motor supported by said lever arm with provision for adjustment rotatably, a pulley driven and carried by the motor and located eccentrically of the center of such angular adjustment, a pulley connected with the spindle, and belting embracing said pulleys, the angular adjustment of the motor serving to regulate the tension of the belting.

7. In a machine tool, a column having a rectilinear guide, bearing blocks mounted on the column and separated from one another in an alinement at one side of and transverse to the direction of said guide, the bearing blocks having slideways transverse both to the alinement of the blocks and to the direction of the guide, a pivot member having flat sided extensions on its ends contained movably in said slideways, a lever mounted oscillatively on said pivot member having oppositely extending arms, a carrier mounted slidably on said guide in pivoted connection with one of the lever arms, a driving motor supported on the other lever arm, a spindle rotatably mounted in the carrier, and rotation-transmitting means between the motor and spindle.

8. A machine tool comprising an upright post having a vertical guideway, a spindle carrier engaged with said guideway and constrained thereby to travel in a vertical path, an operating gear segment pivoted to the carrier, a rack secured stationarily to the column in mesh with said segment, a lever in pivotal connection at one end with the slide supported on the column to rock about a horizontal fulcrum pivot between its ends and being shiftable at its fulcrum horizontally toward and away from the path of the carrier with changing angularity as the carrier is raised and lowered, and a counterweight supported by an arm of the lever at the opposite side of its fulcrum from the carrier.

9. A machine tool comprising an upright post having a vertical guideway, a spindle carrier engaged with said guideway and constrained thereby to travel in a vertical path, an operating gear segment pivoted to the carrier, a rack secured stationarily to the column in mesh with said segment, a lever in pivotal connection at one end with the slide supported on the column to rock about a horizontal fulcrum pivot between its ends and being shiftable at its fulcrum horizontally toward and away from the path of the carrier with changing angularity as the carrier is raised and lowered, and a counterweight supported by an arm of the lever at the opposite side of its fulcrum from the carrier, said counterweight being an electric motor, a spindle rotatably mounted in the carrier, and a belt and pulley drive between the motor and spindle.

10. In a machine tool having a spindle carrier and rectilinear guiding means so engaged with said carrier as to permit bodily displacement thereof and restrict the path of such displacement to an invariable line, an electric driving motor, a spindle rotatably mounted in said carrier, a belt and pulley drive between the motor and spindle, and means for causing the weight of said motor to counterbalance in greater or less measure the weight of said carrier; said means comprising a lever movable angularly and translatively in consonance with the guided movements of the carrier and constructed to maintain an invariable distance between the motor and spindle in all positions.

WILLIAM H. NICHOLS.